US005430598A

United States Patent [19]

Rodolfo et al.

[11] Patent Number: 5,430,598

[45] Date of Patent: Jul. 4, 1995

[54] PROGRAMMABLE TIME INTERVAL POWER STRIP

[76] Inventors: Eulogio F. Rodolfo, 73 Johnson Ave., Staten Island, N.Y. 10307; Michael D. Kleih, 10106 S. Woodrose Ct., Highlands Ranch, Colo. 80126

[21] Appl. No.: 326,187

[22] Filed: Oct. 20, 1994

[51] Int. Cl.6 .............................................. H02H 9/04

[52] U.S. Cl. ..................................... 361/115; 307/141

[58] Field of Search .................. 361/111, 115; 307/40, 307/141

[56] References Cited

U.S. PATENT DOCUMENTS

| | | | |
|---|---|---|---|
| 4,322,632 | 3/1982 | Hart et al. | 307/41 |
| 4,668,878 | 5/1987 | Wyss | 307/141 |
| 4,736,116 | 4/1988 | Pavlak, Jr. et al. | 307/141 |
| 4,999,729 | 3/1991 | Stifter | 361/56 |

*Primary Examiner*—Todd DeBoer

[57] ABSTRACT

A programmable time interval power strip comprising a power input mechanism for receiving external alternating electrical power; a power supply including a power switch having an enabled orientation for allowing delivery of constant electrical power and a disabled orientation for preventing such delivery; a plurality of adjustable timers coupled to the power supply with each timer having an output for generating a relay activation signal; a plurality of receptacles coupled to the power input means and coupleable with a plug-connected appliance; and a plurality of relays coupled to the power input means with a first relay further coupled to the power switch and with the remaining relays each further coupled to the output of a timer and receptacle, the first relay delivering alternating electrical power to its receptacle when the power switch is placed in the enabled orientation and with the remaining relays delivering alternating electrical power to their receptacles upon receipt of the associated relay activation signal.

6 Claims, 4 Drawing Sheets

PROGRAMMABLE TIME INTERVAL POWER STRIP

BACKGROUND OF THE INVENTION

1. Field of the Invention

The present invention relates to a programmable time interval power strip and more particularly pertains to allowing electrical power to be delivered to attaching plug-connected appliances in a timed sequence with a programmable time interval power strip.

2. Description of the Prior Art

The use of power strips is known in the prior art. More specifically, power strips heretofore devised and utilized for the purpose of allowing electrical power to be delivered to attaching plug-connected appliances are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,725,675 to Olsen discloses a power sequencing control circuit. U.S. Pat. No. 4,302,791 to Buchanan et al. discloses a power supply sequencing apparatus. U.S. Pat. No. 4,668,878 to Wyss discloses an electric power switch containing self-programmed control timer with continuously refreshed cycle of on/off sequences. U.S. Pat. No. 4,736,116 to Paviak, Jr. et al. discloses a power-up sequencing apparatus. U.S. Pat. No. 5,211,586 to Maue et al. discloses a power strip.

While these devices fulfill their respective, particular objective and requirements, the aforementioned patents do not describe a programmable time interval power strip that allows electrical power to be delivered to attaching plug-connected appliances in a timed sequence and further allows the timed sequence to be adjusted.

In this respect, the programmable time interval power strip according to the present invention substantially departs from the conventional concepts and designs of the prior art, and in doing so provides an apparatus primarily developed for the purpose of allowing electrical power to be delivered to attaching plug-connected appliances in a timed sequence.

Therefore, it can be appreciated that there exists a continuing need for new and improved programmable time interval power strip which can be used for allowing electrical power to be delivered to attaching plug-connected appliances in a timed sequence. In this regard, the present invention substantially fulfills this need.

SUMMARY OF THE INVENTION

In the view of the foregoing disadvantages inherent in the known types of power strips now present in the prior art, the present invention provides an improved programmable time interval power strip. As such, the general purpose of the present invention, which will be described subsequently in greater detail, is to provide a new and improved programmable time interval power strip and method which has all the advantages of the prior art and none of the disadvantages.

To attain this, the present invention essentially comprises, in combination, a hollow elongated rigid box-shaped housing including a bottom wall, a top wall, and a periphery interconnected between the top wall and bottom wall formed of a pair of opposed long upstanding walls and a pair of opposed upstanding short walls. A power supply is provided and disposed within the housing. The power supply includes an iron core transformer with a primary winding and a secondary winding. The power supply includes a power cord. The power cord has an interior end coupled to the primary winding of the transformer and an exterior end extended from a side wall of the housing and terminated at a plug for receiving alternating electrical power from an external power source. The power supply includes a bridge rectifier coupled to the secondary winding of the transformer. The power supply includes a voltage regulator. The power supply includes a capacitive network coupled between the bridge rectifier and voltage regulator. Lastly, the power supply includes a power switch coupled to the primary winding and voltage regulator and interior end of the power cable with the power switch having an enabled orientation for allowing delivery of constant electrical power and a disabled orientation for preventing such delivery. Timing circuitry is included and disposed within the housing. The timing circuitry is formed of a plurality of solid-state timers. Each timer is coupled to the power supply. Each timer includes adjustable timer delay circuitry for setting a delay time period and an output for generating a relay activation signal whereupon the relay activation signal is generated when the delay time period has elapsed. The timer delay circuitry of each timer further includes a potentiometer extended upwards through the top wall of the housing. Each potentiometer is terminated at a knob for allowing the delay time period to be adjusted upon discretion of a user. A plurality of receptacles are disposed within the housing and extended upwards through the top wall. Each receptacle is coupled to the interior end of the power cord. Each receptacle is used for attaching with a plug-connected appliance for supplying alternating electrical power thereto. Lastly, a plurality of solid-state relays are included and disposed within the container. Each relay is coupled to the interior end of the power cable. A first relay is further connected across the power switch of the power supply. The remaining relays are each further coupled to the output of a separate timer and a separate receptacle. The first relay allows delivery of alternating electrical power to its associated receptacle when the power switch is placed in the enabled orientation. The remaining relays allow delivery of alternating electrical power to their associated receptacles in sequence upon receipt of the associated relay activation signal.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved programmable time interval power strip which has all the advantages of the prior art power strips and none of the disadvantages.

It is another object of the present invention to provide a new and improved programmable time interval power strip which may be easily and efficiently manufactured and marketed.

It is a further object of the present invention to provide a new and improved programmable time interval power strip which is of durable and reliable construction.

An even further object of the present invention is to provide a new and improved programmable time interval power strip which is susceptible of a low cost of manufacture with regard to both materials and labor, and which accordingly is then susceptible of low prices of sale to the consuming public, thereby making such a programmable time interval power strip economically available to the buying public.

Still yet another object of the present invention is to provide a new and improved programmable time interval power strip which provides in the apparatuses and methods of the prior art some of the advantages thereof, while simultaneously overcoming some of the disadvantages normally associated therewith.

Even still another object of the present invention is to provide a new and improved programmable time interval power strip for allowing electrical power to be delivered to attaching plug-connected appliances in a timed sequence.

Lastly, it is an object of the present invention to provide a new and improved programmable time interval power strip comprising power input means for receiving alternating electrical power from an external power source; a power supply coupled to the input means and including a power switch having an enabled orientation for allowing delivery of constant electrical power and a disabled orientation for preventing such delivery; timing circuitry formed of a plurality of timers coupled to the power supply with each timer having an adjustable delay time period and an output for generating a relay activation signal whereupon the relay activation signal is generated when the delay time period has elapsed; a plurality of receptacles with each coupled to the power input means and with each used for attaching with a plug-connected appliance for supplying alternating electrical power thereto; and a plurality of relays coupled to the power input means with a first relay further coupled to the power switch of the power supply and with the remaining relays each further coupled to the output of a separate timer and a separate receptacle, the first relay allowing delivery of alternating electrical power to its associated receptacle when the power switch is placed in the enabled orientation and with the remaining relays allowing delivery of alternating electrical power to their associated receptacles upon receipt of the associated relay activation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
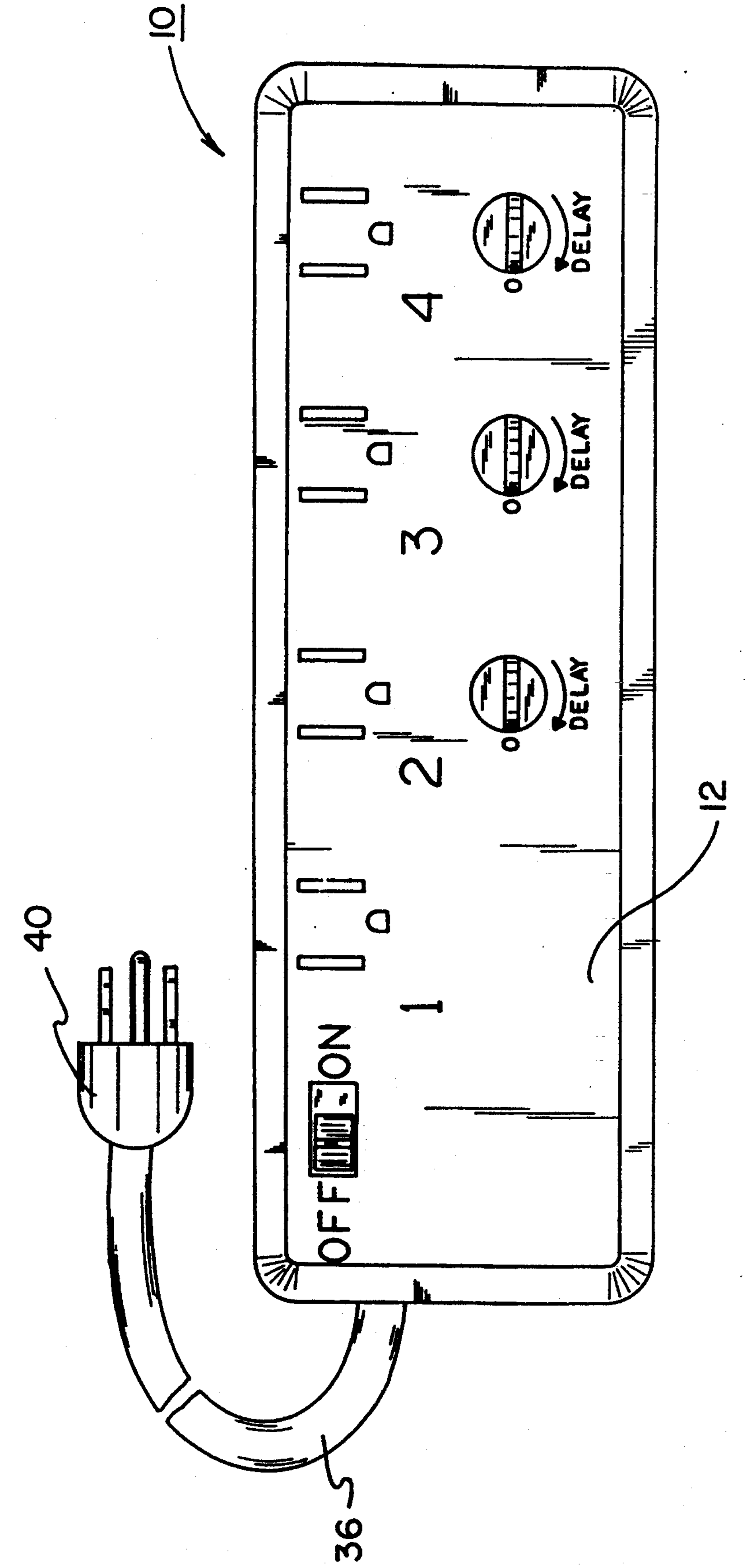
FIG. 1 is a plan view of the preferred embodiment constructed in accordance with the principles of the present invention.
Figure 2:
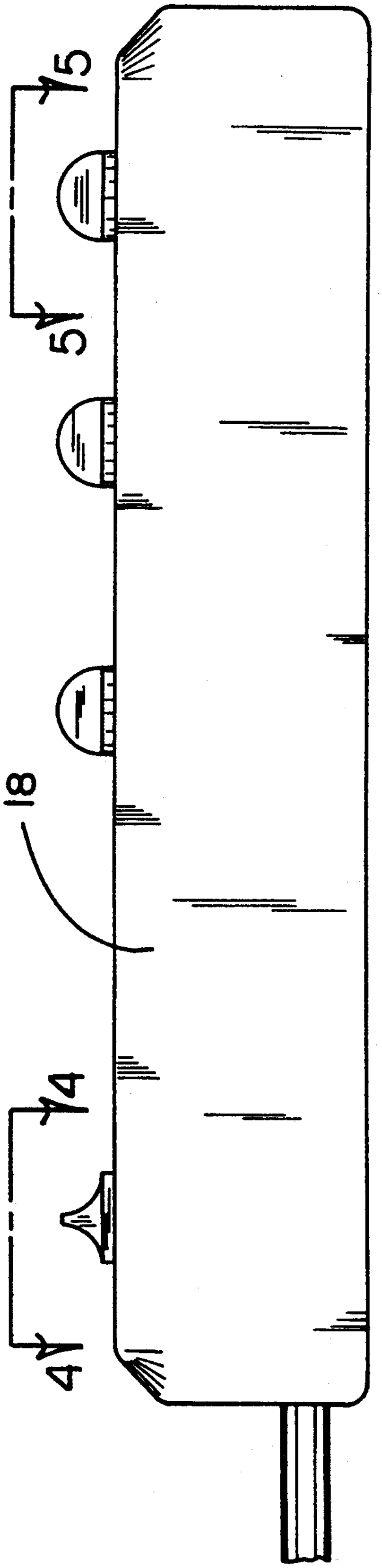
FIG. 2 is a side-elevational view of the present invention.
Figure 3:
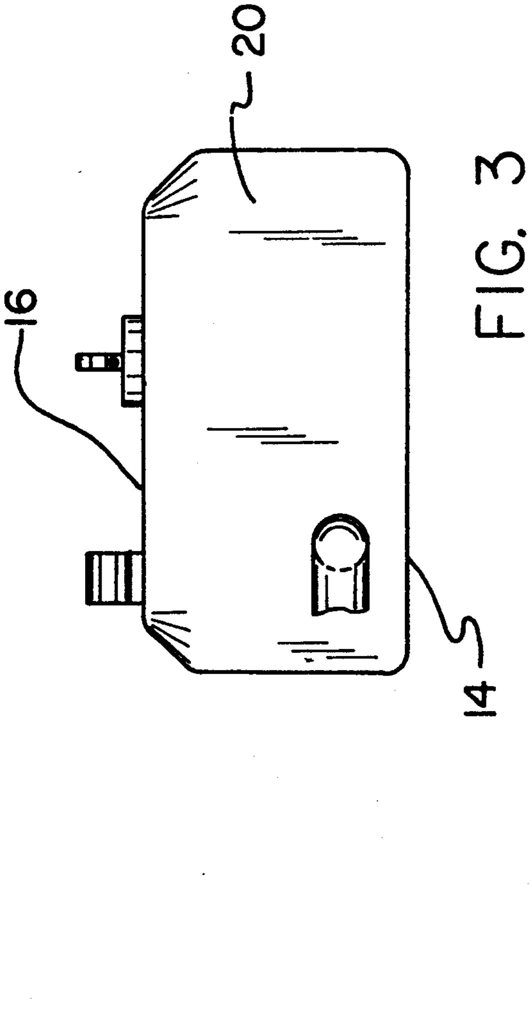
FIG. 3 is yet another side-elevational view of the present invention.
Figure 4:
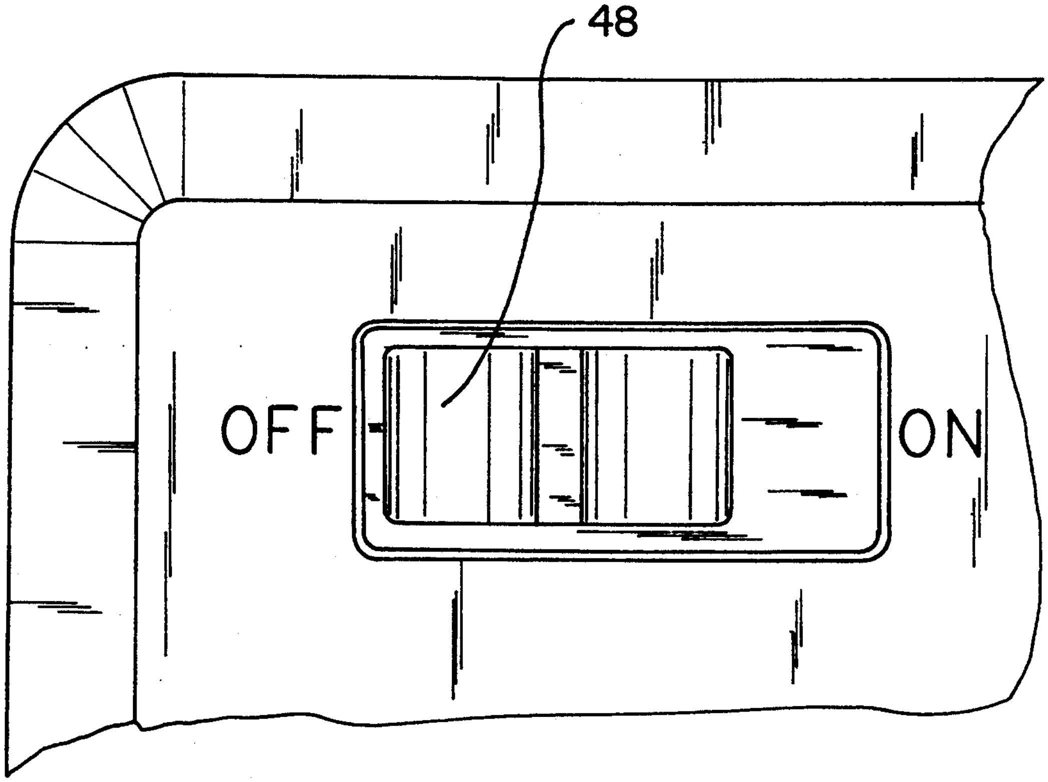
FIG. 4 is an enlarged plan view of the power switch of the present invention taken along the line 4—4 of FIG. 2.
Figure 5:
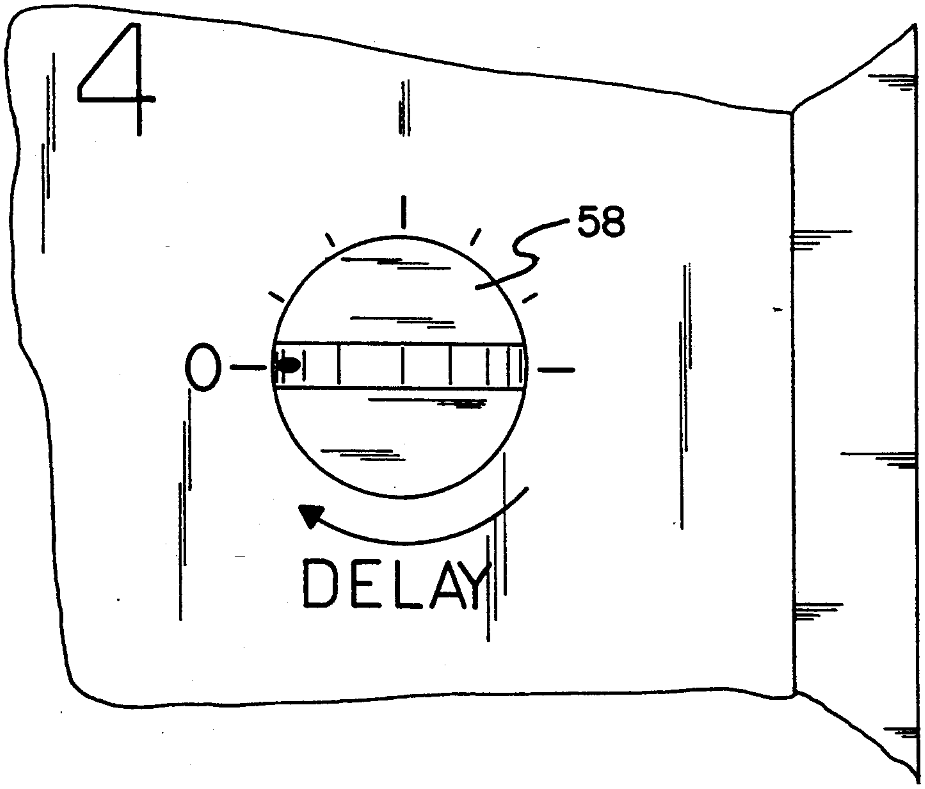
FIG. 5 is an enlarged view of a knob of a potentiometer taken along the line 5—5 of FIG. 2.

With reference now to the drawings, and in particular, to FIG. 1 thereof, the preferred embodiment of the new and improved programmable time interval power strip embodying the principles and concepts of the present invention and generally designated by the reference number 10 will be described.

The present invention is comprised of a plurality of components. In their broadest context, such components include a housing, power supply, timing circuitry, receptacles and relays. Such components are individually configured and correlated with respect to each other to provide the intended function of allowing electrical power to be delivered to attaching plug-connected appliances in a timed sequence.

Specifically, the present invention includes a housing 12. The housing is hollow, elongated and box-shaped in structure. The housing is formed of a rigid material such as plastic or metal or a combination thereof. The housing includes a bottom wall 14, a top wall 16 and a periphery interconnected between the top wall and bottom wall. The periphery is formed of a pair of opposed long upstanding walls 18 and a pair of opposed upstanding short walls 20.

A power supply 30 is disposed within the housing. The power supply includes an iron core transformer. The transformer has a primary winding 32 and a secondary winding 34. The primary winding is adapted to accommodate a standard conventional household line voltage of 120 volts AC. The secondary winding is adapted to accommodate between about 6.3 volts AC to about 25 volts AC. The power supply also includes a sheathed and electrically conductive power cord 36. The power cord has an interior end 38 coupled to the primary winding of the transformer and an exterior end extended from a side wall 20 of the housing. The exterior end is terminated at a non-locking two pole-three wire polarized grounding plug 40. The power cable is used for receiving alternating electrical power from an external household or commercial power source. The power supply also includes a bridge rectifier 42. The bridge rectifier is coupled to the secondary winding of the transformer. The bridge rectifier is rated for at least twice the secondary voltage of the power transformer. A solid state voltage regulator 44 is also provided for ensuring a stable constant voltage for use. The power supply also includes a capacitive network 46 coupled between the bridge rectifier and voltage regulator. The capacitive network is used for smoothing the output of the bridge rectifier. Lastly, a double-pull double-throw power switch 48 is included. The power switch is coupled to the primary winding 32, the voltage regulator 44 and the interior end 38 of the power cable. The power switch has an enabled orientation for allowing delivery of constant electrical power and a disabled orientation for preventing such delivery. A fuse may also be coupled in series with the power switch and matched to the current rating of the power transformer for protection purposes.

The third major component is the timing circuitry 50. The timing circuitry is disposed within the housing. The timing circuitry is formed of a plurality of solid-state timers 52. Each timer is coupled to the power supply 30. Each timer includes adjustable timer delay circuitry 54. The timer delay circuitry is used for setting a delay time. Each timer also includes an output for generating a relay activation signal. When the delay time of a timer has elapsed, a relay activation signal is generated. The timer delay circuitry of each timer further includes a potentiometer 56. The potentiometer of each timer is extended upwards through the top wall 16 of the housing and is terminated at a knob 58. This knob allows the delay time period of the timer to be increased or decreased upon discretion of a user.

The fourth major component is the electrical receptacles 60. The present invention includes a plurality of electrical receptacles. Each receptacle is of the non-locking, two-pole, three-wire, polarized and grounded type. The receptacles are disposed within the housing and extended upwards through the top wall. Each receptacle is coupled to the interior end 38 of the power cord. Each receptacle is used for attaching with a plug-connected appliance for supplying alternating electrical power thereto.

Lastly, a plurality of solid-state relays 70 are provided. The relays are disposed within the container and coupled to the interior end of the power cable. A first relay 72 is further connected across the power switch of the power supply. The remaining relays 74 are each further coupled to the output of a separate timer and a separate receptacle. The first relay allows delivery of alternating electrical power to its associated receptacle when the power switch is placed in the enabled orientation. In the enabled orientation, the power supply is thus activated and thereby activates the timer circuitry. The remaining relays allow delivery of alternating electrical power to their associated receptacles in sequence upon receipt of the associated relay activation signal.

The present invention is a power strip for use with computer-related equipment and other plug-connected appliances. The present invention energizes each receptacle in a timed sequence rather than all at once. The power strip consists of a bank of electrical receptacles contained in a single housing. The present invention has an additional feature of automatically energizing each receptacle after a given amount of delay time has elapsed. The delay time for controlling activation of each receptacle may be individually controlled by rotating a knob or dial. A single power switch is toggled to start energizing the receptacles. When finished, the power switch is again toggled, thus causing the outlets to be de-energized in reverse order.

The sequential energizing of the outlets is designed to protect sensitive equipment used in conjunction with other devices that might create electrical disturbances that can damage sensitive equipment during start-up. The time between activation allows a device to warm up and stabilize before more sensitive devices are activated. The present invention also protects sensitive equipment from power surges or fluctuations sometimes caused by associated electrical equipment or environmental conditions. The present invention can be utilized with computers, printers and other such hardware, powering up each component in an optimal sequence rather than simultaneously.

Figure 6:
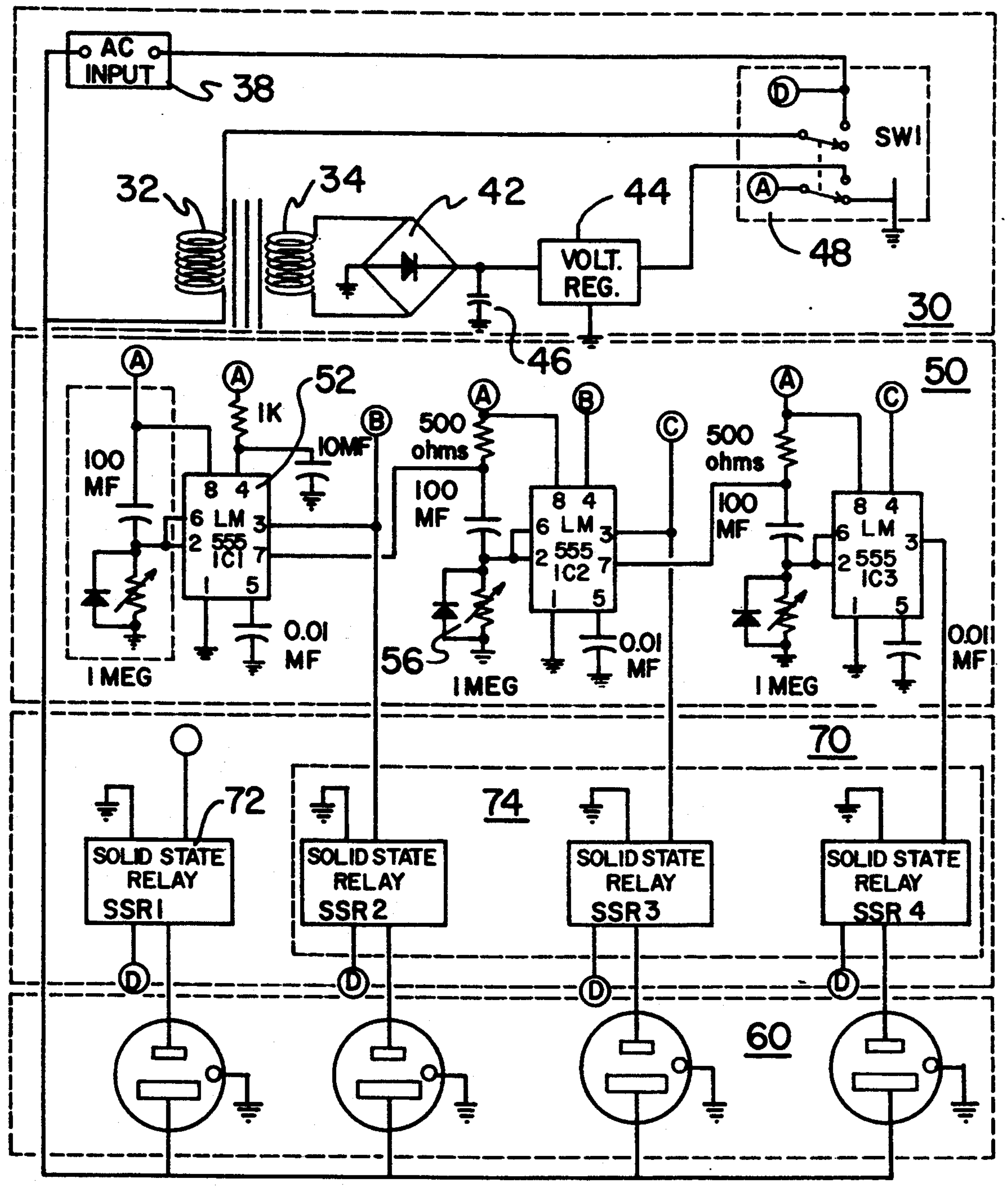
FIG. 6 is an electrical schematic diagram of the present invention.

As depicted in FIG. 6, the timer circuitry is formed with LM555 timers. This type of timer is used because of its robustness, almost perfect immunity to electromagnetic interference and radio frequency interference, economy and availability. The timer circuitry could also be designed by using operational amplifiers in lieu of the LM555 solid-state timers.

A bank of four electrical receptacles are switched on in sequence by solid-state relays SSR1 to SSR4. It is desired that the largest load be switched on first to protect other sensitive equipment from voltage fluctuations, spikes, and sags. Hence, the largest load is plugged into the electrical receptacle 1 controlled by SSR1 as shown in FIG. 1. The current rating value of SSR1 should be such that it can switch at least the start-up current of the largest load. The current rating values SSR2 to SSR3 may be smaller than SSR1.

In the initial state, IC1 to IC3 are all in a "low" state, and SSR1 through SSR4 are de-activated. When SW1 is first turned on, SSR1 is immediately activated. However, SSR2 to SSR3 are still off. When the programmed time interval of IC1 is completed, its output goes "high". Two things happen when IC1 goes "high"-IC1 turns on SSR2 and at the same time enables timer IC2. Similar events happen when the programmed time interval of IC2 is completed. IC2 turns on SSR3 and enable timer IC3. After the programmed time of IC3 is up, IC3 finally activates SSR4. The time interval between activation of SSR1 and SSR2 is controlled by the setting of the potentiometer or trimmer resistor of IC1. The time interval between the activation of SSR2 and SSR3 is controlled by the setting of the potentiometer or trimmer resistor of IC2. Lastly, the time interval between activation of SSR3 and SSR4 is controlled by the setting of the potentiometer or trimmer resistor of IC3.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the U.S. is as follows:

1. A programmable time interval power strip for allowing electrical power to be delivered to attaching plug-connected appliances in a timed sequence comprising, in combination:

a hollow elongated rigid box-shaped housing including a bottom wall, a top wall, and a periphery interconnected between the top wall and bottom wall formed of a pair of opposed long upstanding walls and a pair of opposed upstanding short walls;

a power supply disposed within the housing and including a iron core transformer with a primary winding and a secondary winding, a power cord having an interior end coupled to the primary winding of the transformer and an exterior end extended from a side wall of the housing and terminated at a plug for receiving alternating electrical power from an external power source, a bridge rectifier coupled to the secondary winding of the transformer, a voltage regulator, a capacitive network coupled between the bridge rectifier and voltage regulator, and a power switch coupled to the primary winding and voltage regulator and interior end of the power cable with the power switch having an enabled orientation for allowing delivery of constant electrical power and a disabled orientation for preventing such delivery;

timing circuitry disposed within the housing and formed of a plurality of solid-state timers, each timer coupled to the power supply, each timer including adjustable timer delay circuitry for setting a delay time period and an output for generating a relay activation signal whereupon the relay activation signal is generated when the delay time period has elapsed, the timer delay circuitry of each timer further including a potentiometer extended upwards through the top wall of the housing and terminated at a knob for allowing the delay time period to be adjusted upon discretion of a user;

a plurality of electrical receptacles disposed within the housing and extended upwards through the top wall, each coupled to the interior end of the power cord and each used for attaching with a plug-connected appliance for supplying alternating electrical power thereto; and a plurality of solid-state relays disposed within the container and coupled to the interior end of the power cable with a first relay further connected across the power switch of the power supply and with the remaining relays each further coupled to the output of a separate timer and a separate receptacle, the first relay allowing delivery of alternating electrical power to its associated receptacle when the power switch is placed in the enabled orientation and with the remaining relays allowing delivery of alternating electrical power to their associated receptacles in sequence upon receipt of the associated relay activation signal.

2. A programmable time interval power strip comprising:

power input means for receiving alternating electrical power from an external power source;

a power supply coupled to the input means and including a power switch having an enabled orientation for allowing delivery of constant electrical power and a disabled orientation for preventing such delivery;

timing circuitry formed of a plurality of timers coupled to the power supply, each timer having an adjustable delay time period and an output for generating a relay activation signal whereupon the relay activation signal is generated when the delay time period has elapsed;

a plurality of receptacles with each coupled to the power input means and with each used for attaching with a plug-connected appliance for supplying alternating electrical power thereto; and a plurality of relays coupled to the power input means with a first relay further coupled to the power switch of the power supply and with the remaining relays each further coupled to the output of a separate timer and a separate receptacle, the first relay allowing delivery of alternating electrical power to its associated receptacle when the power switch is placed in the enabled orientation and with the remaining relays allowing delivery of alternating electrical power to their associated receptacles upon receipt of the associated relay activation signal.

3. The programmable time interval power strip as set forth in claim 2 wherein the power input means, power supply, timing circuitry, receptacles and relays are encased in a housing.

4. The programmable time interval power strip as set forth in claim 2 wherein the delay time of each timer is adjustable through the use of a knob at the discretion of a user.

5. The programmable time interval power strip as set forth in claim 2 wherein the timers are of the solid-state type.

6. The programmable time interval power strip as set forth in claim 2 wherein the relays are of the solid-state type.

* * * * *